July 20, 1943.  P. HUTT  2,324,844
REMOTE CONTROL SWITCH
Filed Dec. 18, 1940
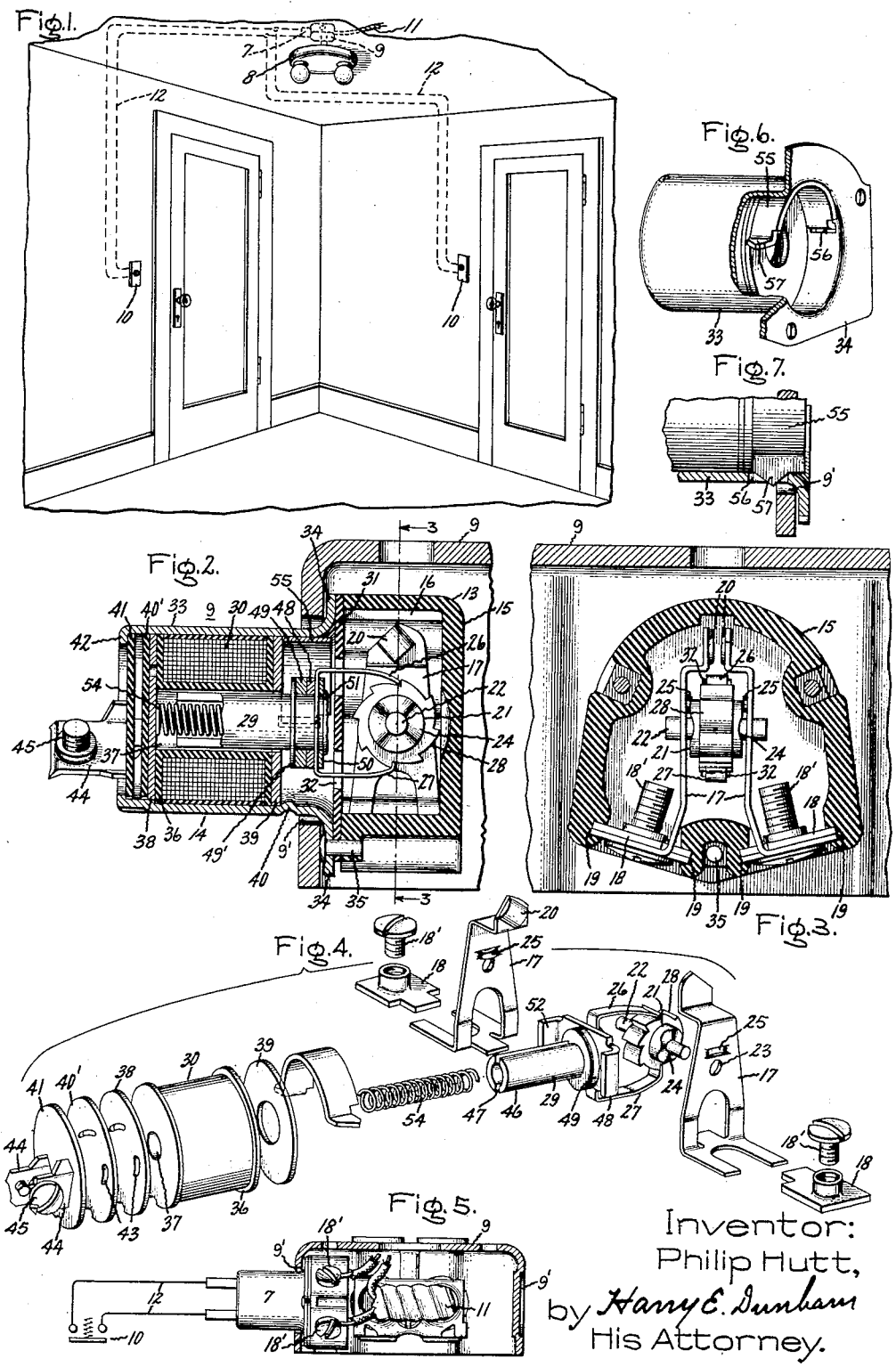
Inventor:
Philip Hutt,
by Harry E. Dunham
His Attorney.

Patented July 20, 1943

2,324,844

UNITED STATES PATENT OFFICE 2,324,844

REMOTE CONTROL SWITCH

Philip Hutt, Milford, Conn., assignor to General Electric Company, a corporation of New York Application December 18, 1940, Serial No. 370,695

3 Claims. (Cl. 200—105)

My invention relates to wiring systems, and more particularly to remotely controlled wiring systems for residence use.

An object of my invention is to provide an improved relay so incorporated into a house wiring system that the associated wiring circuit, for example, a lighting circuit, may be controlled from any one of a number of points.

Another object of my invention is to provide an improved relay of the type described which is compact and rugged and which may be readily incorporated into the existing wiring system of a residence.

A further object of my invention is the provision of a relay so constructed as to be mountable within an electric junction box of the type ordinarily used in house wiring systems.

In the accompanying drawing Fig. 1 is a view showing an installation of my relay in a residence wiring system; Fig. 2 is a sectional view through the relay showing it mounted in the junction box of a wiring system; Fig. 3 is a sectional view along the line 3—3 of Fig. 2; Fig. 4 is an exploded view of the relay mechanism; Fig. 5 is another view of the relay mounted in position in the junction box of a wiring system, and Figs. 6 and 7 are views of a means for holding the relay in position in a junction box.

In many wiring systems, for example, in house lighting systems, it is desirable to provide a circuit arrangement which may be installed at low cost, which may be readily adaptable for the needs of a particular installation, and which may be flexible so that the system may be controlled from any number of conveniently located points. In ordinary residential installations now in use it is customary to wire the system from the lighting fixtures to the controlling switches with suitable high voltage cable such as armored or non-metallic sheathed cable, which is adapted to operate under the full voltage with which the system is supplied, for example, 110 volts. This means that long runs of high voltage cable must be made between the controlling switches and associated lighting fixtures, or the like, particularly, in the case where a lighting fixture is controlled from any one of a number of points; for example, a light which is controlled from the head and the foot of a stairway. Inasmuch as this type of cable is relatively high in cost these long runs of high voltage cable add to the expense of the installation and, in many cases, cause installation of lighting systems that are inadequate for the needs of the residence.

According to my invention these deficiencies may be overcome by employing a relay to operate the lighting fixtures, or the like, and by operating it from any one of a number of points. It is contemplated that the relay be operated at a relatively low voltage as compared with the voltage required in operating the lighting circuit; for example, 16 volts, although other voltages may be used. This means that it is unnecessary to run high voltage cable from the relay to the control points or switches. Inasmuch as it is proposed to mount the relay in a junction box of the wiring system adjacent the controlled lighting fixture, a great deal of expense is saved in wiring the system inasmuch as low voltage conductors, for example, bell wire, may be run from the relay to the controlling switches. Furthermore, the relay system is so designed that an unlimited number of controlling switches may be used. This makes it possible to control the relay and its associated lighting fixture from any number of points. For example, it might be desirable to control a light in a garage of a residence from several points within the house and from a point outside the house. Not only may my relay be built into new wiring systems but it may be readily incorporated into existing systems simply by mounting it within the junction box of the system.

The relay is so designed that the high voltage contacts controlling the circuit to the associated lighting fixture are located within the junction box where they are segregated from low voltage terminals located outside the box. Moreover, the relay is so constructed that it may be mounted in a junction box simply by inserting it through one of the openings ordinarily provided in the box for the reception of armored cable or rigid conduit of a conventional wiring system.

Referring to Fig. 1 of the drawing my invention employs a relay 7 which is illustrated, by way of example, as incorporated in a house wiring system including a lighting fixture 8 supported by a junction box 9 and operated by momentary contact switches 10, the lighting fixture being fed by current from a cable 11 operating at a relatively high voltage, for example 110 volts. The switches 10 are wired to the relay by low voltage cable 12 such as ordinary bell wire and are operated by a current having a relatively low potential, for example, 16 volts. This may be obtained in any convenient manner, for example, from a transformer connected to the high voltage line 13 or from dry cell batteries. In any particular installation only one source of low voltage power is required. Fig. 1 illustrates two switches, each adjacent a door of a room so that the lighting fixture 8 is controlled from two points. Manifestly, the number of switches may be increased or decreased at will.

As shown most clearly by Figs. 2, 3 and 5, the relay 7 is supported by a wall of the junction box 9 and is most conveniently mounted therein by inserting it through an opening 9' in the wall of the box; the opening is made by punching out one of the knockouts which are customarily formed in such junction boxes for the reception of rigid conduit, armored cable, or the like. To facilitate mounting of the relay within the opening 9' it is formed with a relatively large base portion 13 and a relatively narrower extension 14, the extension being inserted through the wall of the box and extending beyond the confines thereof. That portion of the relay housing located within the box contains the contacts which are connected to the high voltage cable 11, while that portion of the relay which extends outside the box contains the terminals and operating mechanism connected to the low voltage wires 12 and the switches 10.

To this end, the base portion 13 comprises a housing 15 of insulating material, for example, a phenolic condensation product and filler, the housing being provided with a recess 16 for the reception of spaced flexible contact blades 17. Each blade 17 is secured in any suitable manner, for example, by spot welding, to a relatively rigid terminal plate 18 mounted in grooves 19 formed in the wall of the housing 15. The grooves 19 are spaced apart as shown most clearly by Fig. 3, so that the contact blades 17 extend into the recess 16 in spaced relationship. Each of the terminal plates 18 is provided with a terminal screw 18' for connection to the conductors of the high voltage cable 13. Each contact blade is biased toward the other so that the circuit through them is completed by permitting them to move toward each other for engagement at their outer ends, the circuit being completed through contact surfaces 20 which may be formed of any precious metal such as silver. The outer ends of the contact blades are bent inwardly toward each other so that engagement of the contact surfaces is effected by only a slight movement or flexure of the contact blades. The contacts are moved to closed and open circuit positions in response to actuation of the switches 10.

Movement of the contact blades is effected by an operating mechanism including a cam member 21 having bearings 22 which rest in openings 23 formed in the contact blades so that the cam member is supported for rotation between the contact blades. In manufacture, the cam is made of molded insulating material. Each side of the cam member is formed with a plurality of hill and valley cam surfaces 24 which cooperate with projections 25 in the contact blades formed by punching in a portion of the metal. As the cam is rotated, the projections 25 follow the hill and valley configurations of the cam surfaces 24 so that the contact surfaces 20 make or break contact in accordance with the position of the cam surfaces 24. The circuit through the contact blades is moved from open to closed position or vice versa by rotating the cam 21 through an angle of approximately 45 degrees.

Rotation of the cam is effected by means of operating fingers 26 and 27 which engage one-way cam surfaces 28 formed on the outer periphery of the cam member 21, the fingers and cam surfaces forming, in effect, a ratchet for movement of the cam member in step by step rotation. The fingers 26 and 27 extend beyond the confines of the recess 16 and are connected to a plunger 29 operated by a solenoid 30. In order to isolate the solenoid 30 and the low voltage portion of the system from the high voltage contacts 17 the recess 16 is closed by a plate 31, preferably formed of insulating material, such as sheet fiber. The fingers 26 and 27 extend through openings 32 in the plate for cooperation with the cam member 21. In addition to separating the high and low voltage portions of the relay, the plate 31 guides the operating fingers 26 and 27 into engagement with the cam member and prevents these fingers as well as the plunger 29 from rotating within the body of the relay.

The operating solenoid 30 is mounted within the extension 14 which is formed of a sheet metal tubular casing or member 33 provided with flanges 34 for mounting it on the base 13. This is accomplished by any suitable fastening means, such as the drive pins 35, which also extend through the closure plate 31 to secure it in position. The tubular member 33 is made of such a size as to pass through the knock-out opening 9' and may be of the order of ⅞ of an inch in diameter. The casing 33 forms a chamber for housing the solenoid and operating plunger which is separated from the recess 16 containing the contacts 17 by the closure plate 31. The solenoid comprises a winding of insulated wire on a drum 36 formed of insulating material and which is provided with a central opening 37 for the reception of the plunger 29. The drum is secured in position in the extension member by means of spaced metal plates 38 and 39, the plate 39 being held in position by indentations 40 formed in the wall of the casing while the plate 38 is secured in position in the casing by engagement with spaced insulating plates 40' and 41 held in position by a lip 42 on the end of the casing. The lead lines from the windings extend through openings 43 in the plates 38 and 40' and are then fastened in any suitable manner to terminal plates 44 mounted in the outer insulating plate 41. The terminals plates 44 are provided with terminal screws 45 for connection to the low voltage wires running to the switch 10. This structure provides a rigid assembly for holding the solenoid securely within the casing 33 so that it may operate the contact cam member 21 through the medium of the plunger 29.

The plunger 29 slides within the opening 37 in the center of the solenoid; it is formed of two semi-circular members 46 separated by an air gap 47 to reduce eddy currents through the plunger. These members are secured together at one end by means of a steel armature plate 48 locked between a copper ring 49 and steel washer 49' on one side of the plate and a steel washer 50 on the other side, the ends of the semi-circular members 46 being peened over as shown at 51 to secure the assembly together. The armature 48 is provided with ears 52 at each end facing the solenoid 30 which cooperate with the solenoid in pulling the plate toward it when the solenoid is energized by actuation of one of the switches 10. During energization of the solenoid the copper disk 49 in conjunction with the alternate magnetic paths provided by washer 49' and plate 52 acts as a pole shader to reduce the noise inherent in a solenoid operated by alternating current. After deenergization of the solenoid the plunger is moved to outward position by a coil spring 54 located in the space between the semicircular members 46 in the interior of the plunger and biased between the plate 38 and the closed end of the plunger. The actuating fingers 26 and 27 form the arms of a U-shaped metal strip clamped between the armature plate 48 and the washer 50 in the manner illustrated by Fig. 2. Lateral movement of the plunger is limited in one direction by simultaneous engagement of washer 49' and of the ears 52 of plate 48 with the plate 39 of the solenoid, while movement in the other direction under the influence of the spring 54 is limited by the closure plate 31.

When the plunger moves to the left in the showing of Fig. 2 the lower operating finger 27 engages one of the cam surfaces 28 and rotates the cam member through an angle of approximately 33 degrees opening or closing the contacts 20 as the case may be and upon deenergization of the solenoid the spring 54 moves the plunger to the right to its initial position at which time the upper member 26 likewise engages one of the cam surfaces 28 and moves the cam member through an additional angle of approximately 12 degrees thereby making a total angular movement of approximately 45 degrees or 1/8 revolution for one operation of the solenoid in response to a single actuation of one of the switches 10.

Actuation of the plunger rotates the cam member 21 and causes it to open or close the contacts 20 in sequence as the case may be. If the contacts are in closed position so that the light 8 is "on," operation of either one of the switches 10 will energize the solenoid and cause it to move the contacts to open position. Similarly, when the light is "off," it may be lighted by operating either one of the switches 10. This means that the light is turned either "off" or "on" in response to a single actuation of the relay and since the relay may be controlled from any number of points, it will be apparent that operation of the light from a number of points does not require a complicated wiring system.

One of the advantages of my invention is that it may be applied to existing wiring systems without effecting any substantial changes or alterations in the system simply by inserting it in the junction box customarily embodied in the system. Thereafter, the contact blades 17 are electrically connected in series with the high voltage cable 13 and the electrical fixture to be controlled and the solenoid is connected to the low voltage wires and thence to one or more operating switches 10. The wires 12 running to the operating switches may be of small diameter insulated bell wire and these are very easy to install and are unobtrusive in appearance. The switches 10 may be of an extremely simple type such as an ordinary push button switch inasmuch as the voltage and current through the switch are relatively low. It is not necessary to employ relatively costly switches, capable of interrupting relatively large amounts of current. By my construction the high voltage contact members are completely enclosed within an insulating housing formed by the recess 16. In addition, these contact members and their associated terminals are likewise enclosed within the junction box 8 so that the high voltage portion of the system is completely separated from the low voltage portion. A person operating one of the switches 10, cannot, therefore be subjected to a dangerous shock from the high voltage system.

As pointed out in the preceding paragraphs the relay is mounted in position simply by inserting it through a knockout opening in the junction box; it is held in this position, as shown by Figs. 6 and 7, by a bowed spring member 55 mounted within the tubular casing 33, the ends of which project through openings 56 in the walls of the casing. The ends of the spring member are provided with beveled surfaces 57 so that as the relay is passed through the opening 12 the beveled surfaces engage the walls of the junction box and are flexed inwardly to permit the relay to be seated in position; thereafter they are snapped outwardly by the tension in the bowed spring member and engage the outer wall of the outlet box to lock the relay in position. This provides a ready and easy means of mounting the relay since it may be simply snapped into position in the opening 9'.

As shown by Fig. 5, my relay is extremely compact and takes up only a small portion of the space available in an ordinary junction box. This is made possible by positioning the solenoid operating mechanism outside the junction box; this construction has the further advantage that the low voltage circuit to the solenoid is separate from the high voltage lighting circuit. Compactness of structure is further attained by mounting the contact-operating cam between the contacts and by providing a small amount of travel of the flexible blade contacts to control the circuit therethrough.

What I claim as new and desire to secure by Letters Patent of the United States is:

1. In a relay, a housing, spaced flexible contacts mounted in said housing and a cam member of insulating material supported by and between said contacts, the contacts and cam being provided with cooperating cam surfaces and follower elements for controlling a circuit through said contacts upon rotation of said cam.

2. In a relay, a housing, flexible contact blades mounted in said housing in opposed spaced relationship, a cam member of insulating material mounted between and supported for rotation upon said contact blades, the opposite sides of said cam member being provided with cam surfaces engaging said contact blades for flexing them toward and away from each other to control a circuit therethrough, the outer periphery of said cam member being of annular formation provided with stepped cam surfaces and spaced operating elements cooperating with said stepped cam surfaces on opposite sides of the cam member for rotating said member in a step by step manner.

3. In a relay, spaced flexible contacts mounted in opposed relationship, a cam member of insulating material rotatably supported by and between said contact blades, the opposite sides of said cam member being formed with cam surfaces cooperating with said contact blades to flex them toward and away from each other upon rotation of said cam member to open and close a circuit through said contacts and driving means for moving said cam in step by step rotation.

PHILIP HUTT.